May 18, 1954 B. D. LOUGHLIN 2,678,964

MODIFYING THE TRANSIENT RESPONSE OF IMAGE-REPRODUCERS

Filed Aug. 14, 1950 3 Sheets-Sheet 1

INVENTOR.
BERNARD D. LOUGHLIN
BY Laurence B. Dodds
ATTORNEY

INVENTOR.
BERNARD D. LOUGHLIN
BY Laurence B. Dodds
ATTORNEY

INVENTOR.
BERNARD D. LOUGHLIN
BY Laurence B. Dodds
ATTORNEY

Patented May 18, 1954 2,678,964

UNITED STATES PATENT OFFICE 2,678,964

MODIFYING THE TRANSIENT RESPONSE OF IMAGE-REPRODUCERS

Bernard D. Loughlin, Lynbrook, N. Y., assignor to Hazeltine Research, Inc., Chicago, Ill., a corporation of Illinois Application August 14, 1950, Serial No. 179,122

8 Claims. (Cl. 178—7.5)

*General*

Figures 1, 1A, 8:
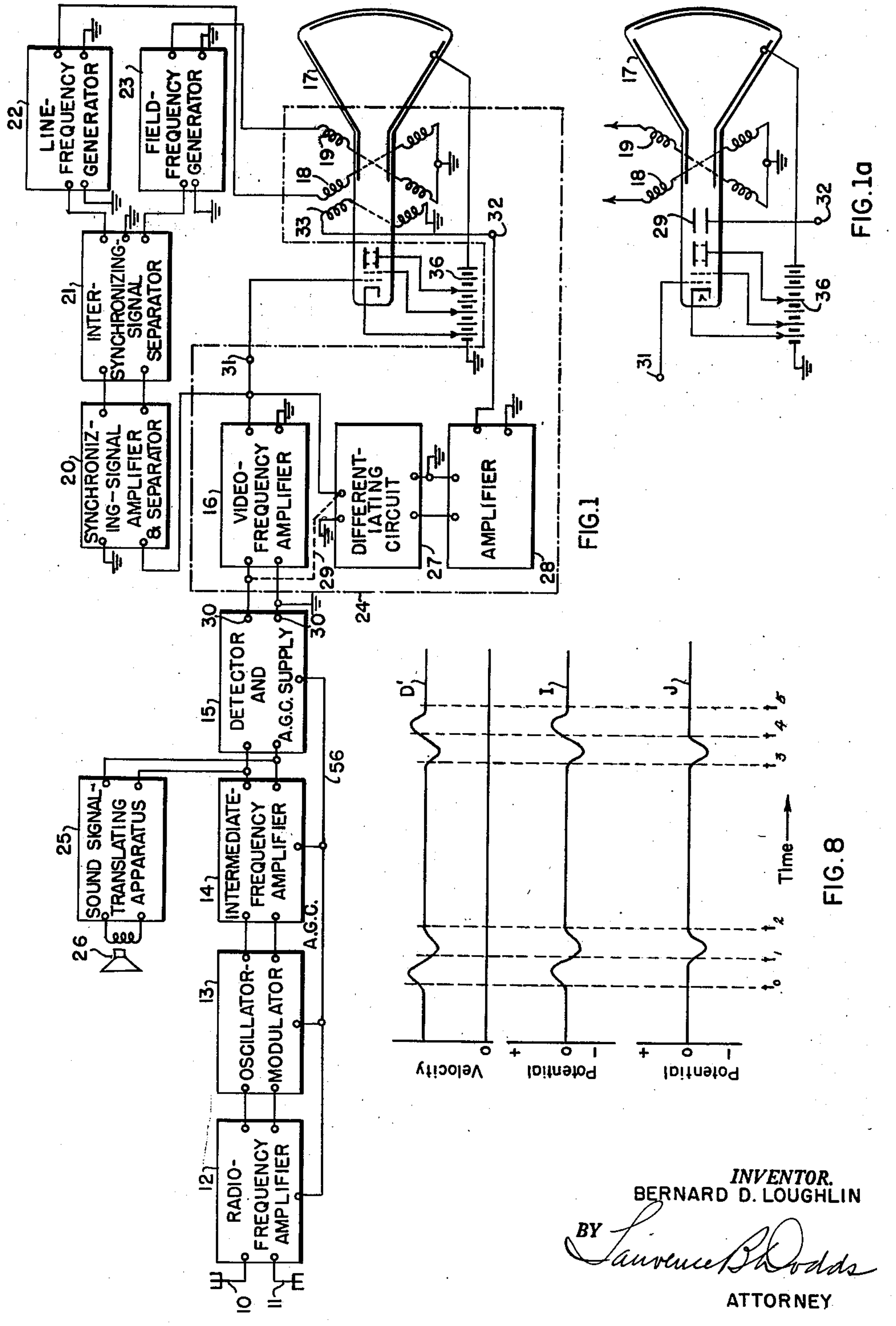

The present invention relates to apparatus for modifying the apparent response of image-reproducing devices to the unidirectional transients of an applied electrical signal. The term "unidirectional transient," as employed in the specification and claims, is intended to denote a sudden change in the amplitude of an electrical signal, such as may occur in the video-frequency portion of a detected television signal between two amplitude levels thereof coresponding to two adjacent brightness levels in the transmitted image, for example, from black to white. Although apparatus of the type under consideration is of general application, it has particular utility in television receivers for improving the sharpness of the images produced by the image-reproducing device thereof and, hence, will be described in that environment.

There presently exists the belief that much of the eye fatigue and other unpleasant reactions often experienced by individuals viewing the image or picture produced by a television receiver is due to insufficient sharpness of the picture rather than to inadequate detail or resolution. By sharpness of the reproduced picture is meant the rate of change of brightness thereof with space, that is, sharpness is related to the appearance of a distinct edge between two areas of different brightness. The lack of sharpness of the picture being viewed is believed to cause the eye muscles of an observer to attempt to produce a sharper or better focused image on the retina of the eye. When the picture being viewed has insufficient sharpness, there may result a continued subconscious action on the part of the observer to focus his eyes in the manner just mentioned, thus causing eye fatigue. On the other hand, inadequate detail in the viewed picture is believed merely to influence the recognition of fine detailed objects. It has been recognized that the above-mentioned distress experienced by one observing television entertainment may be further aggravated as the use of television image-reproducing devices with larger display areas becomes more widespread. This is because one observing a larger television picture is more likely to sit at such a viewing distance that the picture will subtend a larger viewing angle at the eye, thus making the "grain" or "spot" structure of the picture more visible. Since the present trend in television receivers is toward the use of larger image-reproducing devices, the problem of imparting greater sharpness to the television pictures is assuming greater importance.

Considering now a complete television system including both the transmitter and the receiver, there are one or more factors which are instrumental in causing the bandwidth of a television signal translated by the system to be limited. Bandwidth limitation occurs in the scanning spot of the camera pickup tube at the transmitter, in the signal-translating channels of both the transmitter and the receiver, and in the scanning spot of the image-reproducing device of the receiver. The limitation on bandwidth imposes a corresponding limitation on the detail or resolution of the picture produced by the receiver of the television system. In conventional television receivers, the relatively limited bandwidth of the signal-translating channels thereof also undesirably places a limitation on the sharpness of the reproduced picture. Heretofore it has been the opinion of workers in the television art that the resulting limitation placed on the sharpness of the reproduced picture was a fundamental one, that is, that the limited bandwidth imposed by the electrical circuits and the scanning spots inherently prevented the translation of the highest frequency components of an applied television signal, thus prolonging the time required for a transient to pass from one amplitude level to another, and that this necessarily resulted in a degraded transient having a gradual slope rather than a steep one, thus causing a general lack of sharpness in the reproduced picture. It has been demonstrated, however, that the sharpness of the reproduced television picture need not be limited by the bandwidth of the television signal-translating circuits and the scanning spots mentioned above but that the limited bandwidth of the signal-translating stages of television apparatus, such as a television receiver, is effective to limit only the permissible minimum separation between two successive unidirectional transients but need not limit the permissible steepness of a transient.

Although it is desirable, in television receivers having relatively wide pass-band characteristics of the type usually found in such receivers today, to provide apparatus in accordance with the present invention for modifying the apparent response of cathode-ray image-reproducing devices of the receivers to television signals including unidirectional transients to increase the sharpness of the reproduced images, it may also be desirable in many applications, such as in low-cost receivers having relatively inexpensive circuits characterized by their narrow pass-band characteristics, to utilize apparatus of the type under consideration to enable the receivers to produce pictures having a sharpness comparable to that of the pictures produced by conventional television receivers.

It has been proposed in a prior television broadcasting system that, in order to reduce the pass band of the television channel and the television apparatus of the system, the scanning velocity of the electron beam of the pick-up device at the transmitter be varied from its normal velocity in accordance with the folded first derivative of a transient derived by the scanning operation. This folded derivative corresponds to the absolute value of the differential quotient of the transient. More particularly, the speed of the scanning beam at about the time of a transient is reduced momentarily from its normal value and thereafter is returned to that value. A similar scanning velocity variation is effected by suitable equipment at the receiver in such a television broadcasting system. Since the scanning velocity at the receiver is momentarily varied only in one direction (i. e., only reduced) from its normal value, the length of time required for scanning a line of predetermined length will vary depending upon the picture content. Because it is necessary to maintain the movement of the exploring electron beam at the transmitter and the reconstructing electron beam at the receiver in synchronism, synchronizing information must be transmitted for use at the receiver to correct possible deviations from synchronism after each line scansion.

A television receiver constructed to operate in the manner just described is not suitable for use with present-day television transmitters, wherein the scanning velocity of the electron beam of the pickup device is maintained at a predetermined substantially constant velocity. When a receiver of the type described is supplied with a television signal of the type received from a television transmitter operating on current broadcasting standards, undesirable large-area distortion occurs in the picture reconstructed by the receiver. This distortion can only be avoided by operating the described receiver in conjunction with a transmitter which decreases the scanning velocity of its pickup device in accordance with the absolute value of the differential quotient of a transient. Briefly, a receiver of the type described above is not compatible with television transmitters presently in use and is, therefore, generally unacceptable.

It is an object of the invention, therefore, to provide new and improved apparatus for modifying the apparent response of an image-reproducing device to unidirectional transients of an electrical signal which avoids one or more of the above-mentioned disadvantages of prior such apparatus.

It is another object of the invention to provide a relatively simple and inexpensive apparatus for use in conjunction with a television receiver for modifying the apparent response of the image-reproducing device of the receiver to unidirectional transients in the television signal in such a way as to produce a picture of improved quality.

It is a further object of the invention to provide new and improved apparatus for use in a television receiver for modifying the apparent response of the image-reproducing device of the receiver to unidirectional transients in the television signal in a manner to reduce the eye fatigue and unpleasant reactions ordinarily experienced by some observers of television programs.

It is an additional object of the invention to provide an apparatus of the type under consideration for use with a television receiver having a relatively narrow band-pass characteristic to enable the receiver to develop a television image having a quality or sharpness comparable to that of the image produced by a conventional receiver having a much wider band-pass characteristic.

In an image-reproducing system including an image-reproducing device for reproducing an image representing an electrical signal which may include unidirectional transients, an apparatus in accordance with a particular form of the invention for modifying the apparent response of the image-reproducing device to such transients comprises a circuit for applying the electrical signal to an image-reproducing device and means for normally scanning the image-reproducing device at a predetermined velocity. The apparatus further includes control circuit means coupled to the aforesaid circuit and including means for deriving signals representative of the first derivative and of at least a higher order derivative of said transients and including a modulator device responsive to said derived signals and effective to develop a control effect representative jointly of said first derivative and said higher order derivative of the transients of an applied signal. The apparatus further includes electrical means coupled to the aforesaid control circuit means for utilizing such control effect to vary the velocity of scanning from the aforesaid predetermined velocity successively in opposite senses within a short interval after the initiation of a transient, whereby the image-reproducing device is conditioned to produce an image corresponding to the applied signal with modified transients.

The term "derivative," as employed throughout the specification and claims, is intended to denote any signal having the general wave form of a derivative. Broadly speaking a derivative of an applied signal is a signal related to a changing characteristic of that applied signal, that is, a signal which has a zero value when that applied signal is constant in magnitude at any particular amplitude level and has some magnitude other than zero when the applied signal has a transient between two amplitude levels. Thus, the broad term "derivative," as used in the specification and claims, is not necessarily a simple first, second, or third derivative but may include nonlinear functions of simple derivatives, cross products between simple derivatives, time difference signals, or any other functions producing signals of the general form described above. For example, the output signal of a band-pass filter which has a video-frequency signal applied to its input circuit has the general wave form described above. Thus, in this broad sense, a band-pass filter would comprise a network which is effective to develop a derivative signal.

For a better understanding of the present invention, together with other and further objects thereof, reference is had to the following description taken in connection with the accompanying drawings, and its scope will be pointed out in the appended claims.

Figure 5:
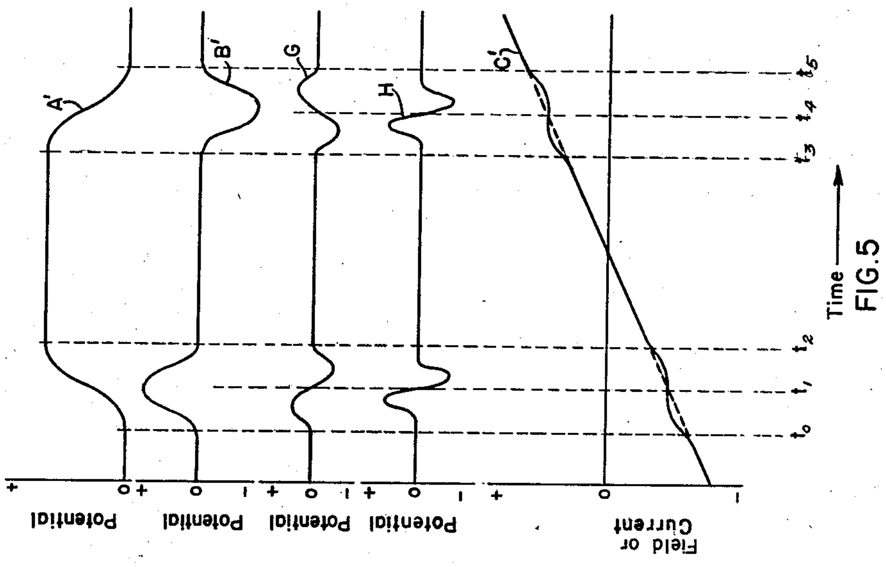
Figure 3:
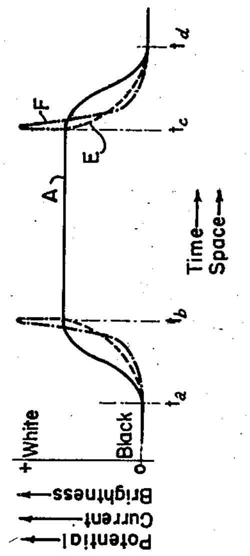
Figure 6:
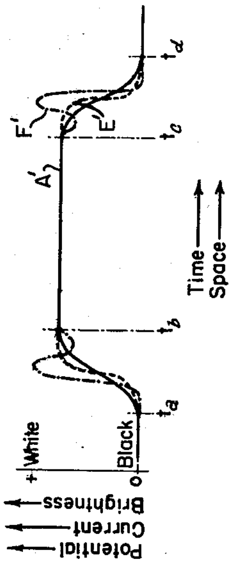
Figure 4:
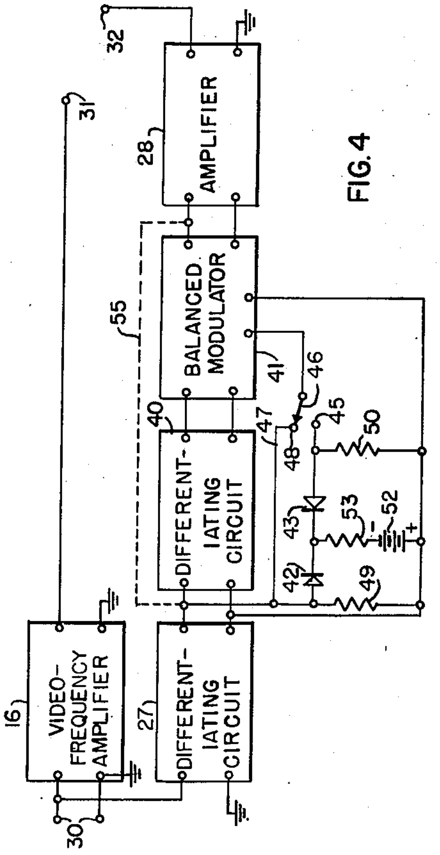
Figure 7:
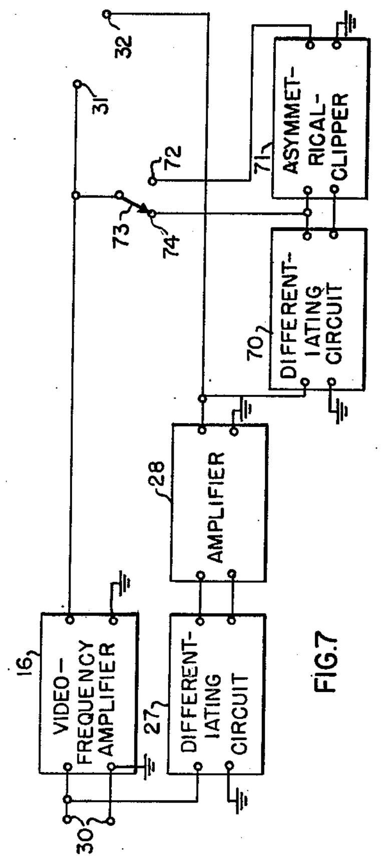
Figure 2:
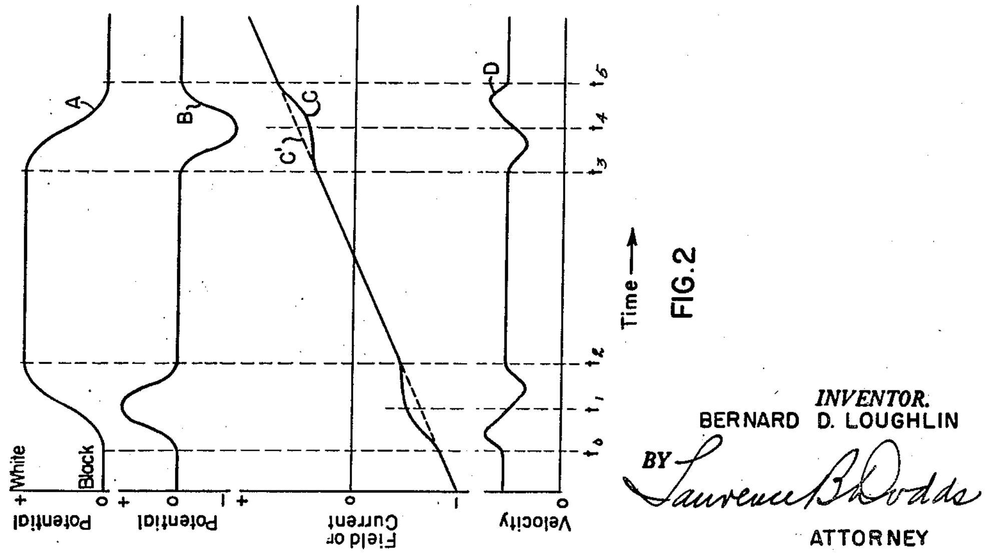

In the accompanying drawings, Fig. 1 is a schematic circuit diagram of a complete television receiver including an apparatus in accordance with the prior art for modifying the apparent response of the image-reproducing device of the receiver to unidirectional transients of the television signal; Fig. 1*a* is a modified form of image-reproducing device which may be employed with the receiver of Fig. 1; Figs. 2 and 3 are graphs utilized in explaining the operation of the response-modifying apparatus of the Fig. 1 receiver; Fig. 4 is a circuit diagram, partly schematic, of a response-modifying apparatus in accordance with the invention; Figs. 5 and 6 are graphs employed in explaining the operation of the apparatus of Fig. 4; Fig. 7 represents another response-modifying apparatus, and Fig. 8 is a graph utilized in explaining the operation of the apparatus represented in Fig. 7.

*General description of Fig. 1 receiver*

Referring now more particularly to Fig. 1 of the drawings, the television receiver there represented comprises a receiver of the superheterodyne type including an antenna system 10, 11 coupled to a radio-frequency amplifier 12 of one or more stages. There is coupled to the latter unit in cascade, in the order named, an oscillator-modulator 13, an intermediate-frequency amplifier 14 of one or more stages, a detector and automatic-gain-control or A. G. C. supply unit 15 having a pair of output terminals 30, 30, a response-modifying apparatus 24 preferably including a conventional video-frequency amplifier 16 of one or more stages, and a cathode-ray image-reproducing device 17 of conventional construction. The brilliancy-control electrode of the image-reproducing device 17 is connected to the high-potential output terminal 31 of unit 16. Unit 17 also includes the usual line-frequency and field-frequency scanning coils 18 and 19, respectively, for deflecting the cathode-ray beam in two directions normal to each other. The A. G. C. supply circuit of unit 15 is connected to the input circuits of one or more of the stages of units 12, 13 and 14 by a control circuit conductor 56. Connected to the two output terminals of the intermediate-frequency amplifier 14 is a conventional sound-signal translating apparatus 25 and a sound reproducer 26.

An output circuit of the video-frequency amplifier 16 is coupled to the input circuit of a line-frequency generator 22 and a field-frequency generator 23 through a synchronizing-signal amplifier and separator 20 and an intersynchronizing-signal separator 21. The output circuits of the generators 22 and 23 are coupled in a conventional manner to the scanning coils 18 and 19, respectively, of the image-reproducing device 17. The units 10–26, inclusive, may be of conventional construction and operation so that a detailed description and explanation of the operation thereof are unnecessary herein.

*General operation of Fig. 1 receiver*

Considering briefly, however, the general operation of the above-described receiver as a whole, television signals intercepted by the antenna system 10, 11 are selected and amplified in the radio-frequency amplifier 12 and are supplied to the oscillator-modulator 13, wherein they are converted to intermediate-frequency signals. The later, in turn, are selectively amplified in the intermediate-frequency amplifier 14 and are delivered to the detector and automatic-gain-control supply unit 15. The modulation components are derived by the detector 15 and are supplied to the video-frequency amplifier 16 wherein they are amplified and from which they are supplied to the input circuit of the image-reproducing device 17. The operation of the unit 24 with reference to unidirectional transients will be explained in detail hereinafter. A control voltage derived by the automatic-gain-control supply 15 is applied as an automatic-amplification-control bias to the gain-control circuits of units 12, 13 and 14 to maintain the signal input to the detector of unit 15 within a relatively narrow range over a wide range of received signal intensities.

Unit 20 selects the synchronizing signals from the other modulation components of the composite television signal applied thereto from the video-frequency amplifier 16. Line-synchronizing and field-synchronizing signals derived by the separator 20 are separated from each other by the unit 21 and are then supplied to individual ones of the generators 22 and 23 to synchronize the operation thereof. An electron beam is produced by the cathode-ray image-reproducing device 17 and the intensity of this beam is controlled in accordance with the video-frequency and control voltages impressed on the brilliancy-control electrode by the input circuit including the terminal 31 of the image-reproducing device. Saw-tooth waves are generated in the line-frequency and the field-frequency generators 22 and 23, respectively, and are applied to the scanning coils 18 and 19 to produce scanning fields thereby to deflect the cathode-ray beam of the image-reproducing device 17 in two directions normal to each other to trace a rectilinear scanning pattern on the screen of the device and thereby reconstruct the translated picture.

The audio-frequency modulation components of the received signal are derived in a well-known manner by the sound-signal translating apparatus 25 and are applied to the sound reproducer 26 wherein they are converted to sound.

*Description of response-modifying apparatus of Fig. 1*

Referring now more particularly to the unit 24, that apparatus for modifying the apparent response of the image-reproducing device 17 to unidirectional transients of the television signal applied thereto comprises a circuit for applying an input signal to that image-reproducing device. This circuit includes the connections to the brilliancy-control electrode and the cathode of the device 17 and may comprise the video-frequency amplifier 16 and any one or more of the preceding signal-translating units 12–16, inclusive, the output circuit of amplifier 16 being coupled in a conventional manner to the input circuit of unit 17. This input circuit includes the terminal 31 coupled to the control electrode of unit 17 and also includes a connection comprising an adjustable tap coupled between the cathode of device 17 and a positive potential point on a potential-supply means represented as a battery 36 for that device. The video-frequency amplifier 16 and the amplifier stages of units 12–16, inclusive, may have a frequency pass band corresponding to that of conventional such amplifiers, for example, one having a sharp cutoff characteristic at the high-frequency end of its pass band. Alternatively, the over-all frequency pass band of the receiver may be considerably less than that of a conventional television receiver so that the translation of unidirectional transients by the channel tends to be impaired due to its inability to translate the very high-frequency components.

The apparatus 24 for modifying the apparent response of the image-reproducing device 17 to unidirectional transients also includes electrical means for normally scanning the device 17 at a predetermined velocity. The term "electrical means," as employed in the specification and claims, is meant to include such an element or elements as an electrostatic plate or plates or an electromagnetic winding or windings which are suitable for controlling or influencing the deflection of an electron beam. In particular, this electrical means comprises electromagnetic means in the form of the described line-scanning and field-scanning coils 18 and 19, respectively. The response-modifying apparatus in accordance with the invention further includes control circuit means coupled to the circuit for applying the video-frequency signals to the image-reproducing device 17, the aforesaid means being effective to develop a signal representative of a derivative of the transient of an applied signal. This control circuit means comprises a series-coupled combination including a differentiating circuit 27 of conventional construction and video-frequency amplifier 28 which is coupled to the output circuit of the amplifier 16 for developing a first derivative of a unidirectional transient appearing in the video-frequency signal. For some applications, it may be desirable to couple the differentiating circuit 27 to the input circuit of the video-frequency amplifier 16, as represented by the conductor 29 shown in broken-line construction, rather than to the output circuit thereof in order that the output signal of unit 28 shall have the same time delay as the signal applied to the briliancy-control electrode of the image-reproducing device 17.

The response-modifying apparatus 24 additionally includes electrical means for utilizing the control effect or first derivative of the unidirectional transient developed by the units 27 and 28 to vary the velocity of scanning from the aforesaid predetermined velocity successively in opposite senses within a short interval after the initiation of a transient, whereby the image-reproducing device 17 is conditioned to produce an image corresponding to the applied video-frequency signal with modified transients. This means may be of the same type as the scanning means including the coils 18 and 19, that is, of the electromagnetic type, or may be of a different type as will be mentioned subsequently. According to one form of the invention, therefore, this means comprises an auxiliary winding 33 which may, for example, be disposed adjacent to the line-scanning coil 18, for example between the conventional focus coil (not shown) and the aforesaid line-scanning coil. This winding 33 is so oriented that it is effective to produce a deflection in the same direction as that produced by the line-scanning coil 18. One terminal of the winding 33 is grounded and the other terminal 32 thereof is coupled to the high-potential output terminal of the amplifier 28.

*Operation of response-modifying apparatus of Fig. 1*

The operation of the response-modifying apparatus 24 represented in Fig. 1 and the results obtained thereby may be best understood with reference to the curves of Figs. 2 and 3. Referring first to Fig. 2, curve A thereof represents to a very enlarged scale a fragmentary portion of an amplified video-frequency signal supplied in a single line scansion to terminal 31. The pulse signal of curve A may represent a vertical white bar in the picture, the edges of the bar having been degraded, as indicated by the rounded corners and sloping edges of the pulse, by the limited pass band of some preceding portion of the television signal-translating channel. This signal is an amplified form of the signal supplied by the output terminals 30, 30 of the detector 15 to the response-modifying apparatus 24. At time $t_0$ a positive-going unidirectional transient of the television signal is initiated and terminates at time $t_2$. Following the transient the unidirectional signal continues at a substantially uniform amplitude level until time $t_3$ whereupon a second and negative-going unidirectional transient occurs and terminates at approximately time $t_5$. For the purpose of the explanation which follows, it will be assumed that the band-pass characteristic of the transient response-modifying apparatus 24 of Fig. 1 including the amplifier 16, when unmodified by the action of units 27, 28 and 33, is incapable of faithfully translating transients steeper than those represented in curve A of Fig. 2.

The differentiating circuit 27 responds to the transients described in the preceding paragraph and, by the well-known differentiating operation, develops an output signal, which after amplification in unit 28, is represented by curve B of Fig. 2.

The output signal of units 27 and 28 comprises a control effect which is representative of the first derivative signal of that of curve A. In the absence of the application of the first derivative signal represented by curve B to the auxiliary winding 33, the variation of the line-scanning current or field with time is substantially linear during the entire interval $t_0$–$t_5$, as shown by the sloping line C′ which includes the broken-line portions immediately beneath curve B of Fig. 2. As previously stated, the winding 33 produces deflection in the same direction as the line-scanning coil 18. Consequently, the application by the units 27 and 28 of the first derivative signal to the winding 33 modifies the scanning field developed by the complete scanning system, comprising the winding 33, 18 and 19 of the image-reproducing device 17, during the intervals $t_0$–$t_2$ and $t_3$–$t_5$ so that the effective scanning current or field varies with time in the manner represented by the solid-line curve C.

It will be seen from curve C that the resultant scanning field departs from linearity by increasing in magnitude during the interval $t_0$–$t_2$ and then proceeds to vary linearly during the succeeding interval $t_2$–$t_3$. During the next succeeding interval $t_3$–$t_5$ the resultant scanning field again departs from linearity by decreasing in amplitude. After the time $t_5$ the rate of variation is again normal, or linear. Since the velocity of scanning by the electron beam of the image-reproducing device 17 is related to the first derivative of the field represented by curve C, the scanning velocity varies from its predetermined or normal constant value during the intervals $t_0$–$t_2$ and $t_3$–$t_5$ as represented by curve D. Thus the application of the first derivative signal of the unidirectional transients represented by curve A of Fig. 2 to the winding 33 causes the velocity of scanning to have a variation as represented by curve D. During the first portion $t_0$–$t_1$ of the interval $t_0$–$t_2$, the scanning velocity increases from its normal or predetermined value and then during the second portion $t_1$–$t_2$ of that interval it decreases from the aforesaid predetermined value and returns at approximately time $t_2$ to its normal value. During the first portion $t_3$–$t_4$ of the next transient interval $t_3$–$t_5$, the scanning velocity is reduced with reference to its predetermined value, and then, during the second portion $t_4$–$t_5$ thereof, the scanning velocity increases with respect to the predetermined velocity. Thus it will be seen from the shape of the scanning velocity curve, curve D during each of the transient intervals $t_0$–$t_2$ and $t_3$–$t_5$, that the units 27 and 28 by their action on the winding 33 are effective to vary the velocity of scanning of the image-reproducing device 17 from a predetermined velocity successively in opposite senses within a short interval after the initiation of transients.

The correct polarity of the first derivative which is applied by the units 27 and 28 to the auxiliary scanning winding 33 of the image-reproducing device 17 is that polarity which initially accelerates the scanning during a black-to-white transition in the video-frequency signal and which initially decelerates the scanning during a white-to-black transition. It will be shown subsequently that this has the effect of narrowing the white areas of the image reproduced by unit 17 and widening the black areas thereof.

The desired result produced by the described modification of the scanning field to produce a resultant scanning field of the type represented by curve C of Fig. 2 may best be understood by referring to Fig. 3 of the drawings. In Fig. 3, the solid-line curve A represents a fragmentary portion of the video-frequency signal during the interval $t_a$–$t_d$ and corresponds to curve A of Fig. 2. This curve A may also be considered to represent the instantaneous beam current-space curve as well as the brightness-space curve of the image-reproducing device 17 when the scanning thereof has a constant velocity and the device 17 has a linear control-signal brightness characteristic. The dash-line curve E with its solid-line connecting portion during the interval $t_b$–$t_c$ represents the instantaneous beam current-space curve of the image-reproducing device 17, ignoring velocity effects, when the transient-modifying apparatus is in operation so that the resultant scanning field is as represented by curve C of Fig. 2. The dash-dot-line curve F with its solid-line connecting portion during the interval $t_b$–$t_c$ represents the brightness-space curve of the image-reproducing device 17 ignoring velocity effects, when the transient-modifying apparatus is in operation. Curve F differs from curve E because, for a given instantaneous beam current, the brightness is inversely proportional to the instantaneous scaning velocity. Thus the brightness-space curve F increases gradually during the first portion of the interval $t_a$–$t_b$ because the velocity of scanning of the image-reproducing device is greater during that portion of the interval. However, during the second portion of the interval $t_a$–$t_b$ the scanning velocity decreases in a manner represented by curve D of Fig. 2. Accordingly, the brightness increases suddenly, thus producing a sudden change in the brightness-space characteristic. However, this brightness may increase to such an extent that an overshoot occurs in curve F due to the cathode-ray beam momentarily coming to rest and then moving on again over the screen of the image-reproducing device.

During the interval $t_b$–$t_c$, the brightness-space curve follows the solid-line curve A. However, at approximately time $t_c$ the scanning velocity decreases in a manner similar to that represented in the corresponding portion of curve D of Fig. 2. Consequently another overshoot representing high brightness may occur in curve F during the first portion of the interval $t_c$–$t_d$. During the second portion of the interval $t_c$–$t_d$, the brightness curve F decreases abruptly since the scanning velocity is now greater than normal in that portion of the interval.

Thus it will be seen from the curves of Fig. 3, particularly curves A and F thereof, that the derivative signal applied to the winding 33 so influences the complete scanning system of the image-reproducing device 17 that there are produced transients in the reproduced image which are much steeper than the transients in the applied video signal. Hence, the image-reproducing system including the image-reproducing device 17 and the unit 24 is effective to produce an image corresponding to the video-frequency signal applied to the output terminals 30, 30 of unit 15, but with modified or steeper transients. It will be apparent from curve F of Fig. 3 that the transient-modifying system is effective to cause the white elements of the reproduced picture to be narrower; hence the darker elements thereof are correspondingly wider. Also, the overshoot which may occur in the vicinity of a transient tends to produce some highlighting of the reproduced image. These phenomena indicate that small geometric distortions are present in the reproduced picture. These small distortions, rather than being objectionable, have been found to be desirable in that they enhance the apparent contrast of the picture and tend to compensate for the finite size of the scanning spot of the image-reproducing device.

If the complete signal-translating channel of a television receiver has a pass band of 4 megacycles with a sharp cutoff characteristic, undersirable oscillatory components may be produced in the channel by a steep transient in the applied signal. The transient-modifying system described above may undesirably accentuate these oscillatory components incidental to modifying the transient response. In a television image-reproducing system of the type under consideration, the production of such undesired oscillatory components may be minimized by limiting the pass band of the complete signal-translating channel or giving it a gradual cutoff characteristic, or both. This restricted pass band and gradual cutoff characteristic of the complete signal-translating channel produces some degradation of the slopes of steep transients. However, the transient-modifying apparatus more than compensates therefor and is effective to reproduce an image with sharper transients than those of the applied signal without the effects of annoying oscillatory components.

Considered from a somewhat different standpoint, the video-frequency amplifier 16 may be regarded as at least a portion of the main signal-translating or intensity-modulation channel for applying a television signal to the brilliancy-control electrode of the image-reproducing device 17, while the units 27, 28 and 33, when the input circuit of unit 27 is coupled to the output circuit of unit 15 by the conductor 29, may be considered as an auxiliary velocity-modulation signal-translating channel for effectively applying the very high frequency components of the video-frequency signal to the device 17. This viewpoint is particularly significant when the amplifier stages of units 12–15, inclusive, have a wide pass-band characteristic and the video-frequency amplifier 16 has a narrow pass band which may have a gradual cutoff characteristic. In the case just mentioned, the amplifier 16 is unable to translate to the device 17 the very high frequency components comprising the steep transients of the television signal. These components are, however, effectively applied to the device 17 by units 27, 28 and 33. In fact, when the brilliancy-control electrode of the image-reproducing device 17 of a television receiver of the type represented in Fig. 1 is disconnected from the amplifier 16 and the adjustable tap coupled to the cathode of device 17 is adjusted so that there is a visible raster, a signal related to the high-frequency components of the television signal may be observed on the screen of the device due solely to scanning velocity modulation of the type described above.

The following relations, which are well known to those skilled in the art, also confirm the preceding statement, namely: the brightness of the image produced by the device 17 is inversely proportional to the beam-scanning velocity; the scanning velocity for the system under consideration is a constant plus the second derivative of a transient in the video-frequency signal; and the second derivative of that transient is related to the high-frequency components of the video-frequency signals.

When the very high frequency components of a signal are not translated by the video-frequency amplifier 16 but are effectively applied to the cathode-ray image-reproducing device 17 by scanning velocity modulation, an improvement is obtained in the sharpness of the picture in addition to that previously described. Consider a short impulse as being applied to the system. If the video-frequency amplifier 16 has a limited pass band, the impulse signal applied to the brilliancy-control electrode will have less peak amplitude and a greater width than if the video-frequency amplifier had a wider pass band. However, the high-frequency components of the impulse are effectively applied to the image-reproducing device by scanning velocity modulation so that the reproduced impulse appears to have a large peak brightness and a narrow width of the order of that which would be obtained with a video-frequency amplifier having a wide pass band. This large peak brightness is obtained with less instantaneous beam current by slowing down the scanning spot. The smaller value of the instantaneous beam current at the peak of the impulse results in a smaller spot size. As a result of the smaller spot size, an additional improvement is obtained in the sharpness of the reproduced picture. Also better resolution can be obtained from the image-reproducing device at a higher peak brightness when the fine detail is applied by scanning velocity modulation as described.

*Description of Fig. 1a modification*

Referring now to Fig. 1*a* of the drawings, there is represented an image-reproducing device 17 including a somewhat different element which forms a portion of a response-modifying apparatus. The device 17 and its associated circuits correspond with but one exception to those represented in Fig. 1. The image-reproducing device is adapted to be connected to the intensity-modulation terminal 31, to the velocity-modulation terminal 32, and to line-frequency and field-frequency generators in the manner represented in connection with the image-reproducing device of Fig. 1. In lieu of the winding 33 represented in Fig. 1, the image-reproducing device of Fig. 1*a* includes within the envelope thereof a suitable beam-deflecting electrode 29 to which the first derivative of a transient is applied to vary the velocity of scanning of the device 17 in the general manner previously explained in connection with the corresponding device of the Fig. 1 receiver. It may be preferable for some applications to position the deflecting electrode 29 near the signal-input electrodes of the electron-gun structure of the image-reproducing device 17. This may be accomplished without causing any particular defocusing of the spot produced on the screen of the device 17 since the amplitude of the signal required for application to the deflecting electrode in the position just mentioned would be extremely small. Because the deflection sensitivity of a deflecting electrode positioned near the signal-input electrodes of the electron-gun structure is high, it is possible to include a simple differentiating circuit within the envelope of the image-reproducing device 17 to obtain the desired sharpening effects of the type previously considered.

It will be clear from the foregoing description of Fig. 1*a*, that the windings 18 and 19 and the deflecting electrode 29 effectively comprise scanning means of different types for controlling the electron beam of the device 17. It will also be clear that deflecting plates may also be employed in place of the windings 18 and 19 in conjunction with the deflecting electrode 29 or in conjunction with an auxiliary winding such as the winding 33 represented in Fig. 1.

*Description of Fig. 4 apparatus*

It has been explained in connection with the curves of Figs. 2 and 3, in particular with reference to curve C of Fig. 2 and curve F of Fig. 3, that the application of the first derivative of a transient to the winding 33 associated with the scanning system of the image-reproducing device of Fig. 1 while effectively sharpening the image reproduced by the device 17, produces a certain geometric distortion in which white elements of the reproduced picture are narrower and the black elements are wider. Although this distortion is small and not ordinarily objectionable, it may be reduced by applying to the winding 33 of Fig. 1 a control potential which varies the excitation of the scanning system of the image-reproducing device 17 in a manner related to the second derivative of the unidirectional transient in the video-frequency amplifier applied to the unit 16. Such a response-modifying apparatus is represented in Fig. 4.

Referring now to Fig. 4 of the drawings, the apparatus in accordance with the invention there represented is adapted to be coupled to the terminals 30, 30 and 31 and 32 of the television receiver of Fig. 1. Units corresponding to those of the response-modifying apparatus of Fig. 1 are designated in Fig. 4 with the same reference characters. The video-frequency amplifier 16 may have any one of the pass-band characteristics mentioned in connection with the corresponding amplifier of the Fig. 1 circuit arrangement. Coupled between the differentiating circuit 27 and the amplifier 28 is a second differentiating circuit 40 and a conventional balanced modulator 41. Also coupled between the output circuit of the first differentiating circuit 27 and a second input circuit of the balanced modulator 41 is a means having a nonlinear signal-translating characteristic for symmetrically limiting the first derivative signal from unit 27. This means comprises a pair of rectifier devices 42 and 43 which are connected in cascade and in opposite polarity between an output terminal of the unit 27 and a contact 45 of a two-position switch 46. The switch 46 is, in turn, connected to an input terminal of the modulator 41. A conductive connection 47 also appears between the terminal just mentioned of unit 27 and another contact 48 of switch 46. Resistors 49 and 50, respectively, are connected between the corresponding terminals of devices 42 and 43 and the other output terminal of unit 27. Connected between the junction of the devices 42 and 43 and the last-mentioned terminal of unit 27 is a battery 52 and a resistor 53 which are effective normally to maintain the rectifier devices in a conductive state. A conductive connection represented by the broken line 55 may be employed between the output circuit of unit 27 and the input circuit of the amplifier 28.

*Operation of Fig. 4 apparatus*

The operation of the response-modifying apparatus of Fig. 4 may be best explained in connection with the curves of Figs. 5 and 6. It will be seen from an examination of these figures that, with the exception of curves G and H, the curves correspond generally to those of Figs. 2 and 3. Accordingly, similar curves in Figs. 5 and 6 are identified by the same reference characters primed. Curve A′ represents a fragmentary portion of the video-frequency signal applied to the terminals 30, 30 of Fig. 4 for translation by the amplifier 16 to the terminal 31. Curve B′ represents the output signal of the first differentiating circuit 27 that is applied to the second differentiating circuit 40 which, in turn, derives the signal of curve G which includes the second derivative of the transient occurring during the intervals $t_0$–$t_2$ and $t_3$–$t_5$. Assuming initially that the switch 46 is in the position represented in Fig. 4 and that the connection 55 is omitted, the connection 47 applies the first derivative signal of curve B′ through the switch 46 to an input circuit of the balanced modulator 41. Unit 40 applies the second derivative signal of curve G of Fig. 5 to a second input circuit of the modulator. In the well-known manner, the balanced modulator 41 is responsive jointly to the second derivative signal and to the first derivative signal to produce a control effect or signal which is effectively the product of the two input signals. This product signal is represented by curve H of Fig. 5 and is applied to unit 28 wherein it is amplified and then appears as a signal of the same wave form for application to the terminal 32 associated with the image-reproducing device. It will be seen that the product signal includes pulse portions having steeper leading and trailing edges than those represented for the second derivative of curve G. Also, the polarity of the product signal is opposite from the second derivative signal during each of the intervals $t_3$–$t_4$ and $t_4$–$t_5$. The resultant scanning wave of the image-reproducing device coupled to the terminals 31 and 32 is so modified by the control effect represented by curve H that it varies from linearity during the transient intervals $t_0$–$t_2$ and $t_3$–$t_5$ in the manner represented by curve C′. During approximately the interval $t_0$–$t_1$ the scanning wave varies in a sense opposite to the variation during the interval $t_1$–$t_2$. A similar variation takes place in the resultant scanning wave during the intervals $t_3$–$t_4$ and $t_4$–$t_5$.

The instantaneous beam current-space curve, ignoring velocity effects, for the image-reproducing device associated with the response-modifying apparatus of Fig. 4 appears as represented by curve E′ of Fig. 6 and the brightness space curve therefor, ignoring velocity effects, is as represented by curve F′. It will be seen that the application of the product of the first derivative and the second derivative of a unidirectional transient produces a brightness-space curve having the shape of curve F′. During a first portion of the transient interval $t_a$–$t_b$, the brightness of the reproduced image increases slowly, then rises abruptly during a second portion of the transient interval to a relatively high value, and thereafter during a third portion of the transient interval decreases quite suddenly whereupon, at approximately time $t_b$, it returns to its normal value. It will be seen from curve F′ that the brightness-space curve has a small amount of overshoot and a small amount of undershoot during the interval $t_a$–$t_b$. During the interval $t_c$–$t_d$ of the negative-going transient, the brightness-space curve of the image-reproducing device associated with the response-modifying apparatus of Fig. 4 is the mirror image of that occurring during the interval $t_a$–$t_b$ of the positive-going transient. During the first portion of the interval $t_c$–$t_d$ the brightness undergoes a small amount of brightness undershoot followed by an interval of brightness overshoot occurring prior to time $t_d$. From a comparison of curve F′ of Fig. 6 with the corresponding curve F of Fig. 3, it will be seen that the former desirably has overshoot of lower amplitude and a shape which indicates a very small tendency to cause the white areas of the reproduced image to be increased and the black areas to be decreased, thus causing a very small geometric distortion of the reproduced image which is of opposite type to the geometric distortion produced when only the first derivative is used.

When the switch 46 is connected to the contact 45, the rectifier devices 42 and 43 symmetrically clip the higher amplitude portions of both the positive and negative peaks of the first derivative signal of curve B′ of Fig. 5 and apply the symmetrically limited first derivative to the balanced modulator 41. The operation of the response-modifying apparatus is then generally similar to that described above with the switch 46 connected to the contact 48. Referring for the moment, however, to the control effect represented by curve H of Fig. 5, this effect is a function of the product of the two signals of curves B′ and G. The control effect of curve H is critical with relation to the amplitude of the transient applied to the transient-modifying apparatus. By using a limiter system including the rectifier devices 42 and 43, the effects of amplitude variations of the first derivative signal can be so reduced that the first derivative signal is effective primarily to invert that portion of the signal of curve G occurring during the interval $t_3$–$t_5$ without affecting the amplitude thereof, thereby producing a resultant signal having a wave form similar to that of curve H.

When the connection 55 is made between the output circuit of the differentiating circuit 27 and the input circuit of the amplifier 28 as represented by the broken line in Fig. 4, the first derivative signal is also added to the product signal developed in the output circuit of the balanced modulator 41. From the preceding explanations in connection with the curves of Fig. 5, it will be clear that any appropriate amount of the first derivative signal may be added to the signal output of the unit 41 further to reduce the geometric distortion of the type under consideration appearing in the image produced by the image-reproducing device associated with terminals 31 and 32.

*Description of Fig. 7 apparatus*

Referring now to Fig. 7 of the drawings, there is represented a further embodiment of a response-modifying apparatus, portions of which are identical to those represented in Fig. 1. Accordingly, the same units in these two figures are designated by the same reference numerals. The response-modifying apparatus of Fig. 7 also includes a differentiating circuit 70 which is coupled between the output circuit of the amplifier 28 and the terminal 31 through a switch 73 having contacts 72 and 74. An asymmetrical clipper 71 such as a diode limiter is coupled between the output circuit of unit 70 and contact 72 of the aforesaid switch.

*Operation of Fig. 7 apparatus*

Before considering the general operation of the response-modifying apparatus of Fig. 7, it will be recalled that the brightness overshoots of the type represented by curve F of Fig. 3 for the Fig. 1 apparatus are due to the low velocity of the scanning spot of the electron beam of the image-reproducing device during a portion of the transient intervals, such as in the vicinity of times $t_b$ and $t_c$. The purpose of the units 70 and/or 71 of the Fig. 7 apparatus is to compensate for the effect of the low velocity of the scanning spot which produces brightness overshoots of the type just mentioned during a portion of the transient interval. Briefly considered, this brightness compensation is accomplished by developing the derivative of the control effect applied to the terminal 32 associated with the image-reproducing device and applying that derivative with such polarity to the brilliancy-control electrode of the image-reproducing device as to reduce the intensity of the electron beam as the scanning velocity thereof is reduced by the response-modifying apparatus of the Fig. 1 type.

With the foregoing introduction, the operation of the Fig. 7 apparatus will be clear from the following explanation taken in connection with the curves of Fig. 8 of the drawings. Curve D′ represents the variation with time of the scanning velocity of the electron beam of the image-reproducing device coupled to the terminals 31 and 32 by the action of the units 27 and 28 of the Fig. 7 apparatus. It will be seen that curve D′ of Fig. 8 is the same as curve D of Fig. 2. Curve I of Fig. 8 represents the second derivative of the unidirectional transient produced in the well-known manner by the differentiating circuit 70 from the output signal of the units 27 and 28. With the switch 73 connected to contact 74, as represented in Fig. 7, the second derivative signal represented by curve I of Fig. 8 is applied by the differentiating circuit 70 through the switch 73 and terminal 31 to the brilliancy-control electrode of the image-reproducing device of the image-reproducing system. Since brightness overshoot occurs during the second portion $t_1$–$t_2$ of the transient interval $t_0$–$t_2$ and the first portion $t_3$–$t_4$ of the next transient interval $t_3$–$t_5$, it will be seen from curve I that a negative control potential is applied to the brilliancy-control electrode of the image-reproducing device during the intervals $t_1$–$t_2$ and $t_3$–$t_4$.

This reduces the intensity of the electron beam during each interval when a brightness overshoot would normally occur and thus tends partially to compensate for the reduction of the scanning velocity of the electron beam.

When the switch 73 is connected to the terminal 72, a control signal having the wave form of curve J of Fig. 8 is applied to the terminal 31 associated with the brilliancy-control electrode of the image-reproducing device. It will be noted that the asymmetrical clipper 71 removes only the positive amplitude portions of its input signal represented by curve I and produces in its output circuit a control signal having only negative polarity pulses during the intervals $t_0$–$t_2$ and $t_3$–$t_5$. Thus the intensity of the electron beam is modified in the manner mentioned above and the desired brightness compensation is effected. Since the signal of curve J does not include positive amplitude portions, the reproduction afforded by the image-reproducing device in the region of black during the first portion of the interval of a positive-going transient and the second portion of the interval of a negative-going transient is not impaired.

From the foregoing descriptions of the various embodiments of the invention, it will be apparent that the response-modifying apparatus in accordance with the present invention for use in an image-reproducing system including an image-reproducing device represents a simple and inexpensive apparatus for modifying the apparent response of the image-reproducing device to unidirectional transients of an applied electrical signal. It will also be clear that a response-modifying apparatus embodying the present invention may be utilized in a television receiver to enable the latter to produce a very sharp picture. A television receiver employing a response-modifying apparatus in accordance with the invention is effective to reduce eye fatigue and other unpleasant reactions ordinarily experienced by some observers of television pictures. It will also be clear that a response-modifying apparatus embodying the present invention is particularly suited for use in a television receiver having a cathode-ray tube with a relatively large display area, since the apparatus is effective to improve the sharpness of reproduction of the picture produced by the receiver.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An image-reproducing system comprising: an image-reproducing device for reproducing an image representing an electrical signal which may include unidirectional transients; a circuit for applying said signal to said device; means for normally scanning said device at a predetermined velocity; control circuit means coupled to said circuit and including means for deriving signals representative of the first derivative and of at least a higher order derivative of said transients and including a modulator device responsive to said derived signals and effective to develop a control effect representative jointly of said first derivative and said higher order derivative of said transients of an applied signal; and electrical scanning means coupled to said control circuit means for utilizing said control effect to vary the velocity of scanning from said predetermined velocity successively in opposite senses within a short interval after the initiation of a transient, whereby said device is conditioned to produce an image corresponding to said applied signal with modified transients.

2. In an image-reproducing system including an image-reproducing device for reproducing an image representing an electrical signal which may include unidirectional transients, an apparatus for modifying the apparent response of the image-reproducing device to such transients comprising: a circuit for applying said electrical signal to an image-reproducing device; means for normally scanning an image-reproducing device at a predetermined velocity; control circuit means coupled to said circuit and including means for deriving signals representative of the first derivative and of at least a higher order derivative of said transients and including a modulator device responsive to said derived signals for developing a control signal representative jointly of said first derivative and said higher order derivative of said transients; an electrical means coupled to said control circuit means for utilizing said control signal to vary the velocity of scanning from said predetermined velocity successively in opposite senses within a short interval after the initiation of a transient, whereby said device is conditioned to produce an image corresponding to said applied signal with modified transients.

3. In an image-reproducing system including an image-reproducing device for reproducing an image representing an electrical signal which may include unidirectional transients, an apparatus for modifying the apparent response of the reproducing device to such transients comprising: a circuit for applying said electrical signal to an image-reproducing device; means for normally scanning an image-reproducing device at a predetermined velocity; control circuit means coupled to said circuit and including means for deriving signals representative of the first derivative and of at least a higher order derivative of said transients and including a modulator device responsive to said derived signals for developing a control signal representative of the product of said first derivative and said higher order derivative of said transients; and electrical means coupled to said control circuit means for utilizing said control signal to vary the velocity of scanning from said predetermined velocity successively in opposite senses within a short interval after the initiation of a transient, whereby said device is conditioned to produce an image corresponding to said applied signal with modified transients.

4. In an image-reproducing system including an image-reproducing device for reproducing an image representing an electrical signal which may include unidirectional transients, an apparatus for modifying the apparent response of the reproducing device to such transients comprising: a circuit for applying said electrical signal to an image-reproducing device; means for normally scanning an image-reproducing device at a predetermined velocity; differentiating means coupled to said circuit for developing a first signal representative of the first derivative of said transients and a second signal representative of the second derivative of said transients; means for modulating said second representative signal with said first representative signal to produce a control effect which effectively is the product of said derivatives; and electrical means coupled to said modulator means for utilizing said control effect to vary the velocity of scanning from said predetermined velocity successively in opposite senses within a short interval after the initiation of a transient, whereby said device is conditioned to produce an image corresponding to said applied signal with modified transients.

5. In an image-reproducing system including an image-reproducing device for reproducing an image representing an electrical signal which may include unidirectional transients, an apparatus for modifying the apparent response of the reproducing device to such transients comprising: a circuit for applying said electrical signal to an image-reproducing device; means for normally scanning an image-reproducing device at a predetermined velocity; differentiating means for developing a first signal represntative of the first derivative of said transients and a second signal representative of the second derivative of said transients; a balanced modulator for modulating said second representative signal with said first representative signal to produce a control effect which is effectively the product of said representative signals; and electrical means coupled to said balanced modulator for utilizing said control effect to vary the velocity of scanning from said predetermined velocity successively in opposite senses within a short interval after the initiation of a transient, whereby said device is conditioned to produce an image corresponding to said applied signal with modified transients.

6. In an image-reproducing system including an image-reproducing device for reproducing an image representing an electrical signal which may include unidirectional transients, an apparatus for modifying the apparent response of the reproducing device to such transients comprising: a circuit for applying said electrical signal to an image-reproducing device; means for normally scanning an image-reproducing device at a predetermined velocity; a first differentiating means for developing a first signal representative of the first derivative of said transient; a second differentiating means for developing a second signal representative of the second derivative of said transient; means having a nonlinear translating characteristic coupled to said first differentiating means for symmetrically clipping said first representative signal; a balanced modulator coupled to said second differentiating means and said clipping means to produce a control signal which is effectively the product of said second representative signal and the output signal of said clipping means; and electrical means coupled to said balanced modulator for utilizing said control effect to vary the velocity of scanning from said predetermined velocity successively in opposite senses within a short interval after the initiation of a transient, whereby said device is conditioned to produce an image corresponding to said applied signal with modified transients.

7. In an image-reproducing system including an image-reproducing device for reproducing an image representing an electrical signal which may include unidirectional transients, an apparatus for modifying the apparent response of the reproducing device to such transients comprising: a circuit for applying said electrical signal to an image-reproducing device; means for normally scanning an image-reproducing device at a predetermined velocity; differentiating means for developing a first signal representative of the first derivative of said transients and a second signal representative of the second derivative of said transients; means for modulating said second representative signal with said first representative signal to produce a control effect which is the product of said representative signals; means for effectively adding said first representative signal to said control effect to produce a second control effect; and electrical means coupled to said modulating means and said adding means for utilizing said second control effect to vary the velocity of scanning from said predetermined velocity successively in opposite senses within a short interval after the initiation of a transient, whereby said device is conditioned to produce an image corresponding to said applied signal with modified transients.

8. In an image-reproducing system for a television receiver including an image-reproducing device having a brilliancy-control electrode for reproducing an image representing a television signal which may include unidirectional transients, an apparatus for modifying the apparent response of the reproducing device to such transients comprising: a circuit including a video-frequency amplifier for applying said television signal to the brilliancy-control electrode of an image-reproducing device, said amplifier having a restricted pass band such that it is ineffective to apply to said electrode the high-frequency components of said television signal; means for normally scanning an image-reproducing device at a predetermined velocity; control circuit means coupled to said circuit and including means for deriving signals representative of the first derivative and of at least a higher order derivative of said transients and including a modulator device responsive to said derived signals and effective to develop a control effect representative of the product of said first derivative and said higher order derivative of said transients of an applied signal; and electrical means coupled to said control circuit means for utilizing said control effect to vary the velocity of scanning from said predetermined velocity successively in opposite senses within a short interval after the initiation of a transient, whereby said high-frequency components are effectively applied to said device and said device is conditioned to produce an image corresponding to said applied signal with modified transients.

References Cited in the file of this patent

UNITED STATES PATENTS

| Number | Name | Date |
|---|---|---|
| 2,134,094 | Andrieu | Oct. 25, 1938 |
| 2,182,326 | Urtel | Dec. 5, 1939 |
| 2,227,630 | Carnahan | Jan. 7, 1941 |
| 2,243,599 | Herbst | May 27, 1941 |

FOREIGN PATENTS

| Number | Country | Date |
|---|---|---|
| 413,401 | Great Britain | July 19, 1934 |
| 483,935 | Great Britain | Apr. 28, 1938 |